April 28, 1953
J. C. O'CONNOR
2,636,719
MECHANISM FOR PRODUCING HARD VIBRATIONS FOR
COMPACTION AND CONVEYING OF MATERIALS
Filed Feb. 1, 1950
6 Sheets-Sheet 1
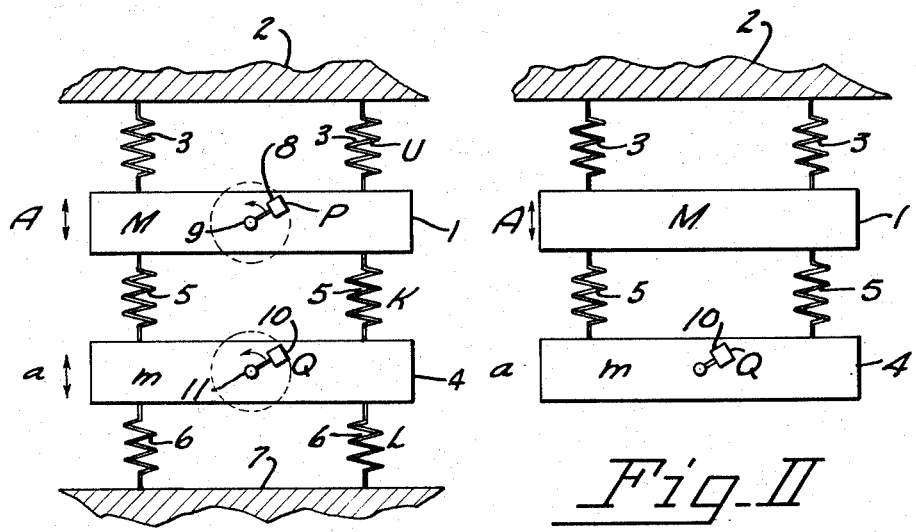
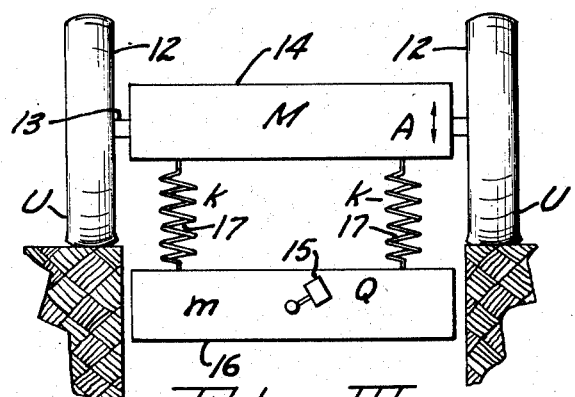
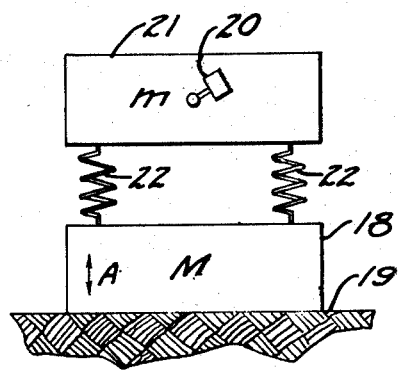
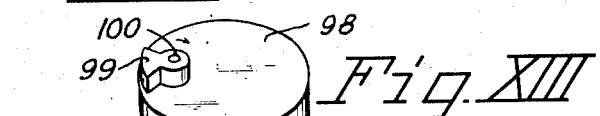
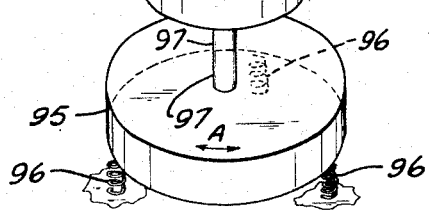
Inventor
John C. O'Connor
Marshall, Marshall & Leonard
Attorneys

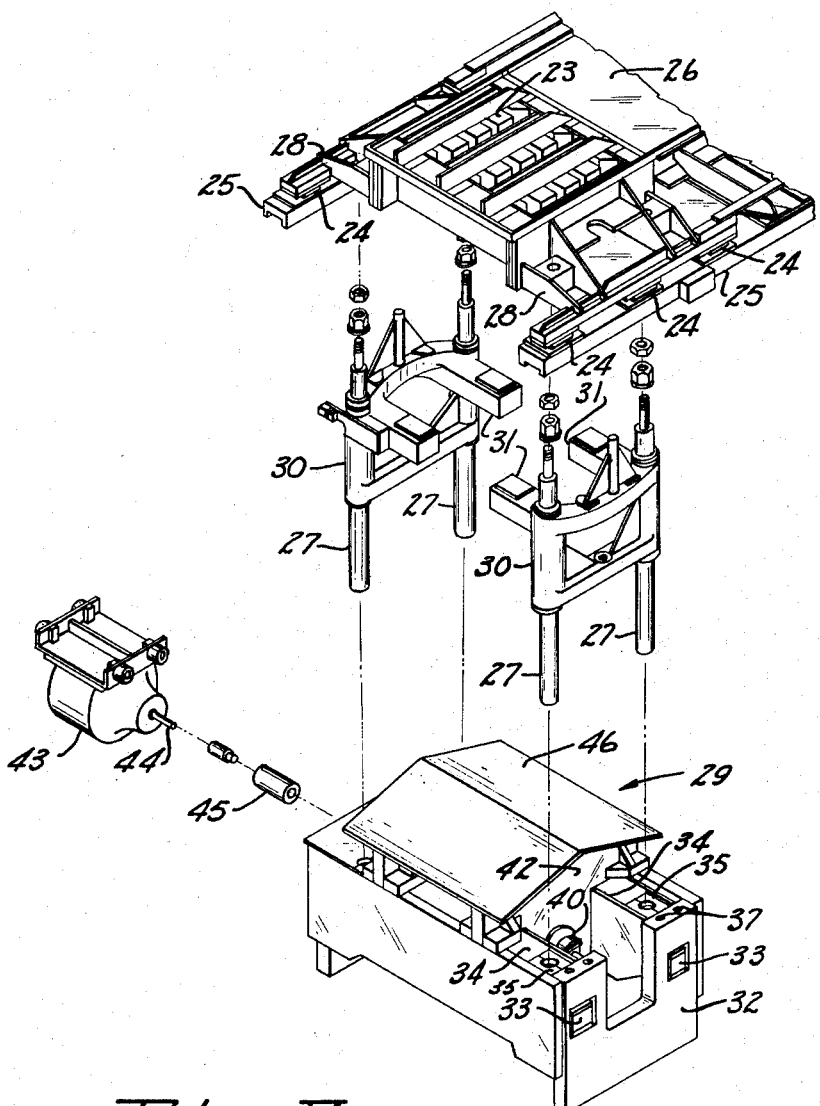

April 28, 1953  J. C. O'CONNOR  2,636,719
MECHANISM FOR PRODUCING HARD VIBRATIONS FOR
COMPACTION AND CONVEYING OF MATERIALS
Filed Feb. 1, 1950  6 Sheets-Sheet 3
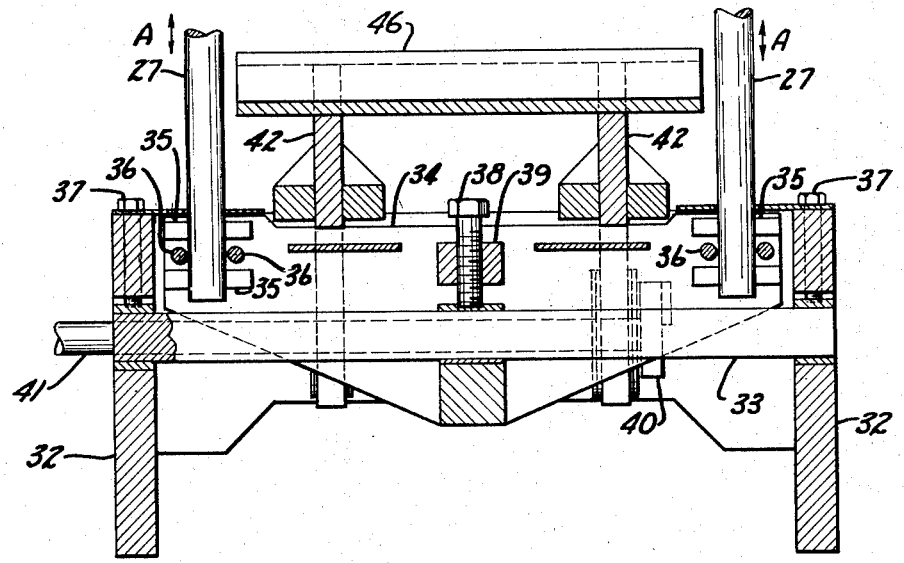
Fig. VI
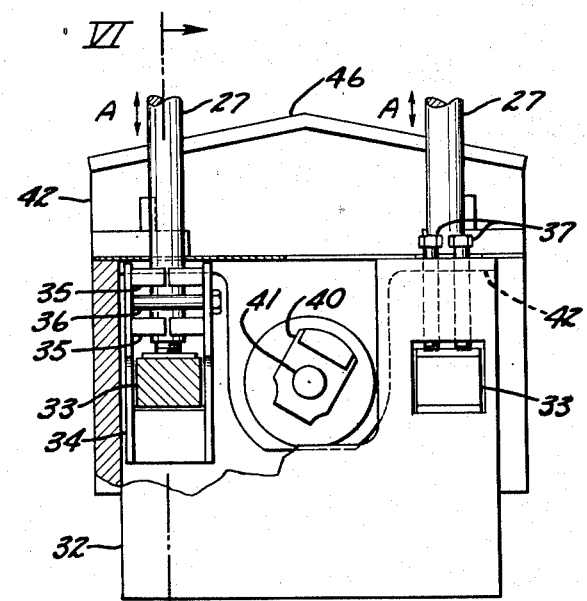
Fig. VII
Inventor
John C. O'Connor
Marshall, Marshall & Leonard
Attorneys

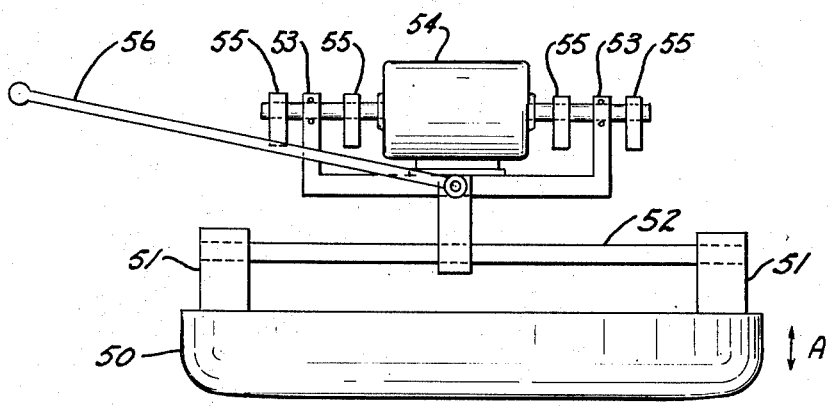
Fig. VIII
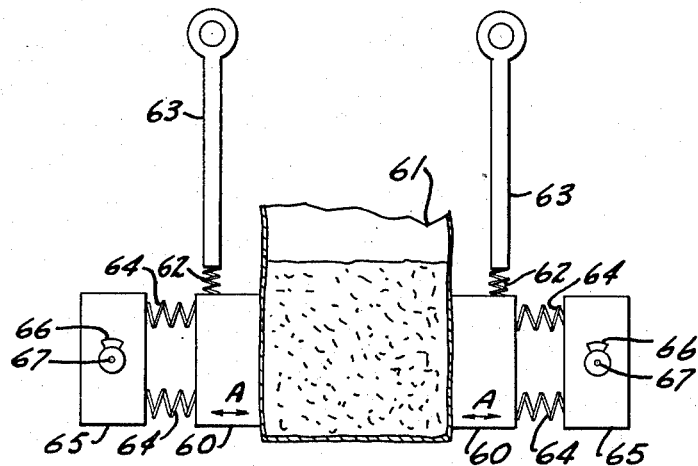
Fig. IX
Inventor
John C. O'Connor

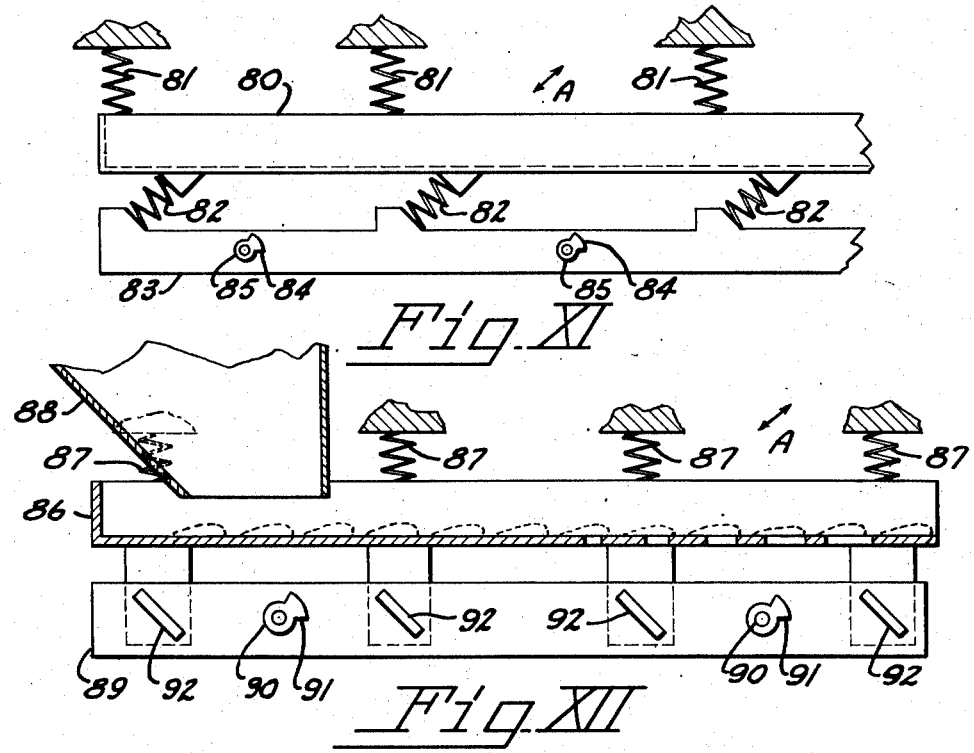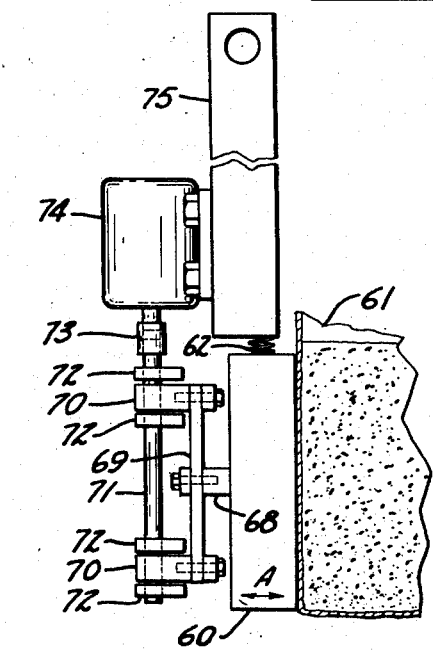

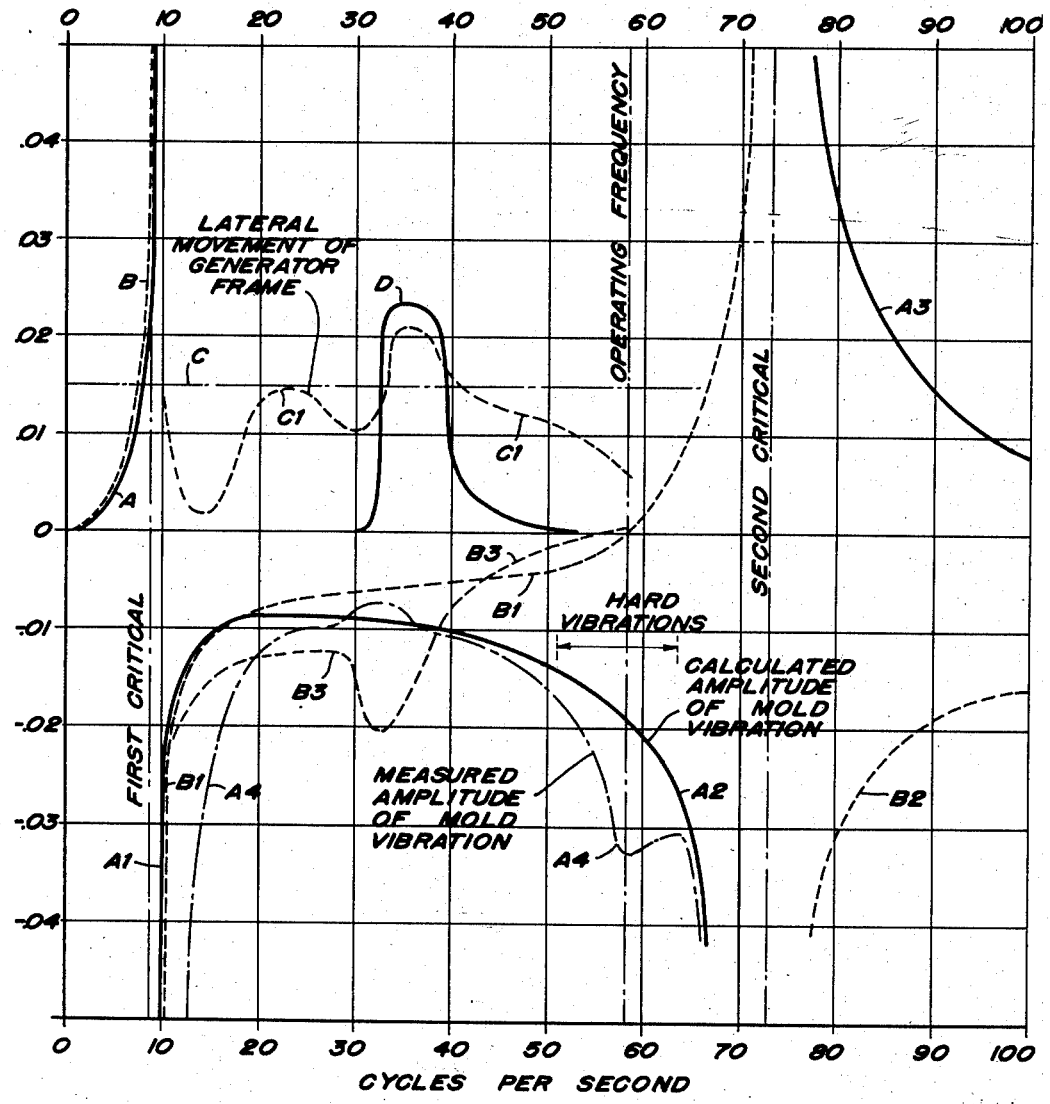
Fig. XIV

Patented Apr. 28, 1953

2,636,719

UNITED STATES PATENT OFFICE 2,636,719

MECHANISM FOR PRODUCING HARD VIBRATIONS FOR COMPACTION AND CONVEYING OF MATERIALS

John C. O'Connor, Ann Arbor, Mich., assignor to The O'Connor Patent Company, Ann Arbor, Mich., a corporation of Michigan Application February 1, 1950, Serial No. 141,686

9 Claims. (Cl. 259—1)

This invention relates to vibration generators and in particular to an improved arrangement in which the force of rotating eccentric weights journaled in one member produce intense linear or torsional vibration of another member on which the member is resiliently supported.

Rotating eccentric weights have often been used for producing vibratory forces. It has been customary when it was desired to produce linear vibration to employ two sets of eccentric weights mounted on parallel contra-rotating shafts so that the force components of the rotating weights are additive in one direction and subtractive in another direction at right angles to the first. The additive components produce the vibration. This apparatus is expensive to build because of the gearing and bearings required to drive and support the second shaft.

This invention is an improvement over the apparatus disclosed in U. S. Patent No. 2,353,492 issued July 11, 1944. The apparatus disclosed in the patent comprises a base mass which is elastically supported and which journals one or more shafts carrying eccentric weights, and a work performing member of substantial mass which is coupled to the base mass by stiff springs. In this arrangement the work performing mass and the springs supporting it from the base member constitute a vibratory system having a resonant frequency substantially equal to the operating speed of the eccentric weights. This structure exhibits the desirable characteristic that the base member has comparatively little motion as the work performing member vibrates violently to absorb practically all the vibratory force produced by the rotating eccentric weights. This system suffers from the disadvantages that some of the vibratory energy is lost through the elastic members supporting the base member from the earth or supporting frame work and that the work performing member is supported from the frame work by the two sets of springs or elastic elements so that its position in space is not precisely determined.

The principal object of the invention is to provide a vibration producing mechanism in which the work performing member is resiliently supported from the earth or from some supporting frame work or material to be worked upon and in which vibratory forces are generated by means of weights carried in a shaft that is journaled on a frame resiliently connected to and supported by the work performing member.

Another object of the invention is to provide a vibration producing mechanism in which the vibratory energy is channeled to flow in one direction to produce linear or torsional vibration in a work performing member the only transmission of energy to the member being through a vibratory energy transmitter in the form of a tuned resonant spring capable of transmitting vertical components of force generated by a rotating eccentrically weighted shaft and converting a substantial portion of the horizontal components of force into vertical forces to augment the linear vibration of the work performing member.

A still further object of the invention is to provide structure for producing linear vibration in one member by means of eccentric weights journaled in a second member that is elastically connected to the first member.

More specific objects and advantages are apparent from the following description of preferred embodiments of the invention and in which description reference is made to the accompanying drawings.

In the drawings:

Figure I is a schematic illustration of a generalized vibratory system comprising two weights and three springs and arranged to be set in vibration by vibratory forces produced by eccentric weights journaled in the two masses.

Figure II is a generalized schematic drawing illustrating the improved arrangement according to the instant invention.

Figure III is similar to Figure II and illustrates one modification of the supporting resilient members.

Figure IV is a schematic illustration in which the work performing member, such as a tamper, is supported on the material to be worked.

Figure V is an isometric view of a vibration generator constructed according to the invention and employed to vibrate a mold of a concrete block manufacturing machine.

Figure VI is a side view, with parts broken away and other parts shown in section, of the vibration generator shown in Figure V.

Figure VII is an end view, with parts broken away, of the vibration generator shown in Figure V.

Figure VIII is a schematic illustration of soil compactor or tamper embodying the invention.

Figure IX is a diagram, in schematic form, of a bag packer embodying the invention.

Figure X is a simplified schematic illustration of a bag packer arranged to operate according to the principle illustrated in Figure IX.

Figure XI is a schematic illustration of still another modification of the invention.

Figure XII is a side elevation, partly in section, of a conveyor embodying the invention.

Figure XIII is a schematic illustration of a structure embodying the invention and arranged to produce rotary vibration.

Figure XIV is a drawing in the nature of a graph showing the phase and amplitude of movement of the various members of the vibrating system as a function of the frequency of operation.

These specific figures and the accompanying description are intended to illustrate the invention without limiting its scope.

In a generalized vibratory system comprising two masses and three springs as illustrated in Figure I an upper member having a mass M is supported from the earth or from a frame work 2 by means of springs 3. The springs 3 have a spring rate—units of force per unit deflection of U pounds per inch. A second member 4 is connected to the first member 1 by means of springs 5 having spring rates k pounds per inch. The second member 4 is also connected through springs 6 of spring rate L to the earth or lower supporting structure 7. It is assumed that the movement of the members and the direction of force through springs is in a straight line through the supports 2 and 7 and that the spring rates are constant. An eccentric weight 8 is carried on a shaft 9 journaled in the first member 1 while a second eccentric weight 10 is carried on a second shaft 11 journaled in the second member 4.

When the eccentric weights 8 and 10 are rotated, the corresponding members 1 and 4 have a component of motion in a direction perpendicular to the springs 6 at an amplitude such that the composite centers of gravity of the members and the weights remain fixed in space. This motion is neglected in the following analysis since in particular embodiments of the invention only the force acting in the direction of force transmission through the springs is of interest.

Each of the rotating eccentric weights 8 or 10 is rotated at constant speed and applies force to the member 1 or 4 which force varies as the sine of the angle of rotation of the weight and which has a magnitude proportional to the mass of the weight, the radius of its center of gravity from the axis of rotation, and the square of its speed of rotation. In the following analysis P equals the magnitude of the force exerted by the eccentric weight 8 and Q represents the force exerted by the eccentric weight 10. Further let it be assumed that the weights are rotated at the same speed. With these assumptions it may be shown that the amplitude $a$ of movement of the member 4 having a mass $m$ is:

(1) $$a = \frac{Q(k+U-Mw^2)+Pk}{(k+L-mw^2)(k+U-Mw^2)-k^2}$$

where $w$ is the operating speed of the weights in radians per second. Likewise the amplitude of movement A of the member 1 having mass M is:

(2) $$A = \frac{P(k+L-mw^2)+Qk}{(k+L-mw^2)(k+U-Mw^2)-k^2}$$

These equations are in general form and indicate the magnitude of movement of the members provided the eccentric weights 8 and 10 are rotating in phase as well as at the same speed. If the weights are not rotating in the same phase the equations must be set up to include the phase angle of lead of one weight in respect to the other. Furthermore if the weights are rotating at different speeds the effect of each weight must be calculated and the resultant amplitude is the sum of the separately determined amplitudes.

In the patent above referred to, the vibratory system comprised a base similar to the member 1 and carrying an eccentric weight similar to the weight 8 for producing vibration in a second member corresponding to the member 4 which was supported by springs similar to springs 5. The second eccentric weight 10 and the springs 6 were absent.

According to the instant invention the eccentric weight 10 in the member 4 is used to excite vibration of the member 1 while the eccentric weight 8 and the springs 6 are omitted. The remaining elements are schematically illustrated in Figure II. This arrangement corresponds precisely to that shown in Figure I except for the omission of the springs 6 and the eccentric weight 8. The corresponding movements of the members 1 and 4 may be obtained from the Equations 1 and 2 by setting $P=0$ and $L=0$. Thus the movement of the member 4 becomes:

(3) $$a = \frac{Q(k+U-Mw^2)}{(k-mw^2)(k+U-Mw^2)-k^2}$$

and the movement of the member 1 becomes:

(4) $$A = \frac{Qk}{(k-mw^2)(k+U-Mw^2)-k^2}$$

According to the invention the system is tuned so that:

(5) $$k+U=Mw^2$$

To minimize the transmission of substantial vibratory force to the supporting structure the springs 3 are made much weaker than the coupling springs 5 connecting the members 1 and 4. Ordinarily the spring rate U of the springs 3 is less than 6% of the spring rate $k$ of the springs 5. The tuning is accomplished by adjustment of the mass of the member 1 or the strength of the springs 5 so that Equation 5 is satisfied. When the tuning is such that the Equation 5 is satisfied Equation 3 reduces to Equation 6 while Equation 4 reduces to Equation 7.

(6) $$a=0$$

(7) $$A=-\frac{Q}{k}$$

Thus under the tuned condition the member 4 stands stationary in space while the member 1 oscillates at an amplitude equal to the applied force divided by the spring rate of the coupling springs 5.

The vibrations produced in the member 1 having an amplitude of A may be termed "hard" vibrations because regardless of load conditions the amplitude of motion does not vary appreciably. Thus the amplitude is determined by the force Q, which is constant in any given speed of rotation of the weights, and by the elasticity of the coupling springs which does not vary with load. In contrast, "soft" vibrations denotes the vibrations produced by a vibration generator operated at a resonant condition such that the amplitude varies to a large extent with the load or damping introduced into the system.

These supporting springs 3 that carry the work performing member may take many forms. For example these springs may be in the form of rubber tires 12 mounted on wheels carried on an axle 13 extending laterally from a mold box, shaker, or other vibratory work performing member 14.

The work performing member 14 is vibrated by force exerted by an eccentric weight 15 journaled in a base or generator frame 16 which in turn is supported from the work performing member by means of coupling springs 17. As before, the mass M of the work performing member 14 and the spring rate k of the coupling springs 17 are selected so that the coupling spring 17, plus whatever component of force is obtained from the rubber tires 12, may combine with the mass M to form a vibratory system the resonant frequency of which is equal to the speed of rotation of the eccentric weight 15. The elasticity of the rubber tires 12 can vary over wide limits without affecting the performance of the system. This follows because the coupling springs 17 control the tuning of the system while the supporting springs or tires 12 contribute very little to the vibratory motion of the system.

The supporting springs 3 may be entirely absent, being replaced by the semi-resilient character of some materials that are worked by vibration. Thus a tamper or compactor constructed to embody the invention may be supported directly upon a material to be compacted. Referring to Figure IV, a tamper shoe 18 resting directly upon the soil 19 to be compacted is vibrated by the force of a rotating eccentric weight 20 journaled in a generator frame 21, the frame being supported from the tamper shoe 18 by coupling springs 22. As in the preceding examples the mass of the tamper shoe 18 and the stiffness of the coupling springs 22 are selected so that they form a vibratory system the resonant frequency of which is equal to the speed of rotation of the eccentric weight 20.

These basic arrangements comprising a vibration generator elastically supported from the member to be vibrated and incorporating an eccentric weight may be employed in a variety of practical machines.

As a first example the improved vibration generator may be employed to vibrate the mold of a concrete block manufacturing machine. Figure V shows, in simplified form, a practical embodiment of the invention as applied to a block machine. In this machine a mold box 23, corresponding to the resiliently supported member 1 of Figure II, is supported on rubber cushions 24 which function as the supporting springs 3. The mold 23 and the rubber cushions 24 are supported on channel shaped shoes 25 that are slidably mounted on stationary ways of the machine. In the practical machine the mold 23 is movable to alternate positions in one of which it is located beneath a supply hopper and in the other of which it is located under a pressure shoe serving to flatten the top and regulate the thickness of the block. The pressure shoe is also arranged to strip the blocks from the mold 23 as soon as they have been sufficiently compacted. There is also a flat table-like plate 26 which serves as the bottom of the hopper when the mold is located beneath the pressure shoe.

A plurality of tie rods 27 having their upper ends extending through and clamped in arms 28 of the mold 23 support a vibration generator 29. Also carried on the tie rods 27 are a pair of vertically movable pallet supports 30 having rubber padded arms 31 arranged to support a pallet (a rectangular piece of ¼ to ⅜ inch thick steel of sufficient area to cover the bottom of the mold). The pallet supports 30 are connected hydraulically to the mold 23 so that they may be raised or lowered as may be required during the operation of the machine. Vibrationally the pallet supports 30, the pallet, and the mold 23 constitute a single element of the vibratory system and correspond to the member 1 of Figures I or II.

The vibration generator 29, shown in detail in Figures VI and VII, comprises a heavy outer frame 32 in which a pair of long elastic bars 33 are clamped. The bars 33 are, in effect, heavy springs and correspond to the coupling springs 5 of Figure II. Likewise the frame 32 corresponds to the member 4 of Figure II. Near its center each of the bars supports a yoke 34. The yoke 34, clamped to the spring bar 33, is formed of a pair of side plates and cross braces welded into a box like structure. Cross plates 35 at the ends of the yoke are drilled to receive the tie rods 27 and are also sawed along the center lines parallel to the length of the yoke so that when bolts 36 extending through the sides of the yoke 34 are tightened the sides of the yoke and the plates 35 are drawn together to securely clamp the tie rods 27 in position. This arrangement makes a very compact assembly and is also easy to disassemble and to assemble.

The ends of the bar springs 33 are clamped in the end members of the generator frame 32 by a plurality of bolts 37 which are threaded down through the end plates of the frame 32. Likewise a heavy bolt 38 is threaded through a central block 39 of the yoke 34 to clamp the yoke to the bar springs 33.

The vibratory force of the vibration generator 29 is furnished by a plurality of eccentric weights 40 that are carried on a shaft 41 journaled in cross members 42 of the generator frame. The cross members 42 are generally T-shaped as viewed from the end of the generator frame 32 with the stems of the T-shaped members extending down past the center of the frame. These stems carry self-aligning roller bearings for journaling the shaft 41.

Referring to Figure V the shaft 41 is driven by a motor 43 which is mounted on rollers running on a track (not shown) extending parallel to the path of movement of the generator and mold. The motor is moved along the track by a link extending from the mold drive mechanism. The motor 43 has its shaft 44 connected through a flexible coupling 45 to the shaft 41 to correct for unavoidable misalignment of the shafts 41 and 44.

It has been observed that for best performance of this apparatus the center of gravity of the frame 32 should be located above the axis of rotation of the eccentric weights. In a particular concrete block manufacturing machine capable of making twelve 8″ x 8″ x 16″ blocks per minute the vibration generator frame weighs 1975 pounds and has its center of gravity about 2.3 inches above the axis of the shaft. The mold with its accessories weighs about 1200 pounds and the eccentric weights are driven at 3450 to 3500 revolutions per minute. The eccentric weights themselves total 23.12 pounds at .968 inch eccentricity.

The peak to peak amplitude (the total vibratory movement) of the various masses or weights when driven by these eccentrics may be easily computed. It is well known that the movement of the large weight times its weight must equal the movement of the eccentric mass (diameter of the circle described by its center of gravity) times its weight. The peak to peak amplitudes resulting from applying the eccentrics (a) mold and generator frame bolted together; (b) mold alone; and (c) generator alone is given below:

|  | Total weight in pounds | Amplitude in inches |
|---|---|---|
| Mold and generator frame | 3,175 | .0140 |
| Mold alone | 1,200 | .0373 |
| Generator frame alone | 1,975 | .0235 |

For comparison purposes the amplitude of vibration of the mold when carried on the tuned springs is next determined. To tune the system according to Equation 5 the spring rate must be close to 400,000 pounds per inch. Also at 3450 revolutions per minute the centrifugal force of eccentric weights is about 7,560 pounds. Substituting these values in Equation 7 and remembering that the amplitude A is the peak amplitude (½ the peak to peak amplitude) gives an amplitude of .0189 inch or a peak to peak amplitude of .0378 inch. Thus, mathematically the amplitude of motion of the mold is the same whether the eccentrics are journaled on the frame or directly on the mold. Also mathematically the lateral vibration of the generator is given in the table as .0235 inch. Since the coupling system is assumed to be flexible laterally the amplitude in this direction is controlled by the weight of the frame alone.

In actual operation of the machine however it has been observed that the linear vibration of the mold has considerably greater amplitude at least 60 per cent than theory predicts. An actual peak to peak amplitude of approximately $\frac{1}{16}$ inch has been observed. At the same time the lateral vibration of the generator frame is reduced to less than half of the expected vibration. It has been observed that if the center of gravity of the generator frame 32 is above the axis of the shaft the frequency of the first rocking mode of vibration of the frame is displaced from the ideal operating frequency.

The amplitudes of vibration of the generator frame and the mold as functions of operating frequency are illustrated in Figure XIV. In this figure the abscissa is the operating frequency in cycles per second while the ordinates represent the amplitude of vibration (half the peak to peak amplitude). Since the system is tuned and comprises several coupled masses it has several resonant or critical frequencies. Also, since the operating force for driving the system is the force of a rotating eccentric weight the actual magnitude of the force varies as the square of the frequency of operation. Thus if the weight is rotated very slowly there is practically no force applied to the generator frame or the mold. As the speed of operation increases the force increases much more rapidly.

Referring to Figure XIV the theoretical amplitude of motion of the mold is represented by a line A that starts at zero amplitude at zero frequency and curves upwardly representing an increasing amplitude of motion of the mold. This amplitude becomes very large at a first critical speed occurring at slightly less than 10 cycles per second.

The amplitude of motion of the generator frame at these low frequencies is substantially equal to and slightly greater than the amplitude of motion of the mold. This amplitude is indicated by a dotted line B in the diagram. After passing the first critical frequency, a condition where the mold and generator frame are moving together on the supporting springs, the motions undergo a 180 degree change in phase with respect to the driving force and the amplitude drops rapidly as the frequency rises as is indicated by curve sections A1 and B1. As the speed of operation is raised still further the theoretical motion of the vibration generator frame decreases more or less uniformly until it reaches zero at approximately 57 cycles per second. At higher frequencies the amplitude of motion increases as a second critical speed at approximately 72 cycles per second is approached. In passing through this second critical the phase of the motion again reverses and the amplitude then falls as indicated by a line segment B2.

The vertical movement of the mold has an amplitude as indicated by the line A1 which reaches a minimum at approximately 20 cycles per second and then increases at first slowly and then more rapidly as the second critical frequency at 72 cycles per second is approached as indicated by the line segment A2. In passing through the second critical operating speed the phase of the movement of the mold reverses and its amplitude of movement at frequencies above the second critical is indicated by the line A3.

These curves show the theoretical or calculated amplitudes taking into account only those components of force from the rotating eccentric weights that act in the direction of motion of the mold. The components of force of the eccentric weight that act at right angles to the mold motion tend to produce lateral movement of the generator frame. Since the coupling springs are presumed to be very soft in this direction theoretical transverse movement of the generator frame is of constant amplitude and phase as is indicated by a line C in the diagram.

It has actually been observed when spaced apart coupling springs are employed that the vibration of the mold at the operating speed is greater than theory predicts. By measuring the actual amplitudes of motion it has been found that the transverse movement of the generator frame varies from the predicted amount and is usually less as it is indicated by the line C1. Likewise, the direct movement of the generator frame is greater than theory predicts in the speed range below 40 cycles per second but is less at high speeds. This is indicated by a line segment or curve B3.

The observed motion of the mold is substantially greater than the expected motion except for a narrow operating range at about 34 cycles per second where a rocking motion takes place. Otherwise the reduced transverse movement of the generator frame as indicated by a line C1 corresponds to an increased mold movement as indicated by a line A4 which shows substantial increase in amplitude over that expected, particularly in the speed range from 10 to 20 cycles per second and in the range from 55 to 62 cycles per second. The increase in amplitude represented by the line A4 over that theoretically expected and represented by the line A2 represents actual gain or increased efficiency obtained by channeling or forcing all of the energy from the rotating weight through the springs into the mold and preventing any other dissipation of energy.

In the speed range near 35 cycles per second a rocking motion occurred which resulted in transverse movement of the mold and a corresponding reduction in its desired movement. This transverse movement is indicated by a curve D which corresponds to the humps in the curves C1, B3 and A4.

This diagram also exhibits the phenomenon that the generator frame motion is practically zero at the operating frequency. This has the desirable result, as explained before, that the amplitude of vibration of the mold at the operating frequency is not materially affected by ordinary amounts of energy lost in the mold. At this frequency there is a balance of stored energy in the rotating mass and the coupling springs but there is no excess storage of energy in the springs as occurs at the critical speeds when the amplitude of motion becomes excessive. Therefore, the term "hard vibrations" is applied to vibrations of the mold which are not seriously affected by changes in energy dissipation. The range of frequency where this phenomenon occurs is indicated on the diagram by the notation "hard vibrations."

If there is no loss of energy in the mold or in the supporting springs the amplitude of movement of the generator frame reduces to zero at the desired operating frequency. Under this condition of operating the generator frame becomes a node of a vibrating system of which one branch comprises the mold supported on the springs and the other branch of which comprises the rotating eccentric weight. As long as there is no energy lost in the mold or springs the generator frame stands still as a true node. However, if there is loss of energy in the mold the generator frame undergoes a small movement that is approximately 90 degrees out of phase with the movement of the mold and this movement acting through the springs provides the work energy to supply that lost in the mold or material being worked. Ordinarily this loss is small and this driving motion of the generator frame is small compared to the movement resulting from mistuning of the resonant system.

It has also been observed when the center of gravity of the vibration generator frame is below the axis of the eccentric weights that the mold undergoes an easily observed roll oscillation as well as the vertical translation and that the forces transmitted through the springs 33 because of such roll oscillation produce a substantial increase in the horizontal movement of the upper part of the generator frame 32, the center of roll being in space below the generator frame 32. The vibration generator 29 is therefore constructed with its center of gravity located on its vertical center line at a substantial distance (in the specific example 2.36 inches) above the axis of the rotating weights and when so constructed is found to be very efficient in producing linear vibration of the mold.

It has further been repeatedly observed that a vibration generator and mold assembly constructed and operated as just described produces a much more compact concrete block than do other machines employing vibration of substantially the same amplitude. No explanation has yet been offered to explain the difference in action although it is possible that the slight rotary movement of the mold induced by the frame 32 may be responsible for the superior performance of this apparatus, or that a higher acceleration of the mold is achieved by this combination.

In a typical concrete block manufacturing machine embodying the invention wherein the mold 23 plus all of the parts rigidly connected to it weighs approximately 1200 pounds while the vibration generator frame 32 plus all of the parts rigidly connected thereto weighs approximately 1975 pounds, the springs 33 are selected and the weight of the mold adjusted so that the resonant frequency is in the order of 57 to 60 cycles per second, to correspond to the operating speed of the motor 43. After the machine is assembled weight is added to cover plates 46 of the frame 32 until all tendency toward roll movement of the frame 32 disappears and it is then found that the power taken from the motor 43 to maintain the vibration is substantially a minimum.

One of the advantages of the present arrangement of the vibration generator and mold as contrasted to the arrangement shown in the above mentioned patent is that the vibration generator frame 32 is itself completely free from all stationary portions of the machine and thus may be easily moved with the mold to whatever position is desired, and also is incapable of dissipating vibrational energy except that lost in internal friction or to the air, and that useful energy which is transmitted through the springs to the mold. By making the generator frame extremely rigid and rigidly clamping the ends of the springs 33 the wasted energy is reduced to a minimum. In the previously known construction the lateral vibration of the generator frame was particularly troublesome and tended to dissipate energy through the spring supporting the generator. In the new arrangement some energy may be lost in the rubber pads supporting the mold but this is relatively insignificant. The vibratory energy is channeled in one direction from motor to shaft to frame 32 to driving springs 33 to mold.

Referring to Figure VIII, a soil compactor utilizing the invention may include a shoe 50 the bottom surface of which is adapted to rest on and act against the material to be compacted. This material may be the soil, wet concrete, or other materials that must be compacted in place by forces applied from above. The shoe 50 corresponds to the member 18 of Figure IV or to the member 1 of Figure II. A pair of uprights 51 erected from the shoe 50 receive the ends of one or more beam springs 52 that correspond in function to the coupling springs 5 of Figure II. A U-shaped vibration generator frame 53 is securely clamped or otherwise attached to the midpoints of the beams 52 and carries a driving motor 54 the shaft of which is extended through bearings in the U-shaped frame 53. Eccentric weights 55 are carried on the motor shaft and by their rotation produce vibratory force that is absorbed by vibration of the shoe 50. Because of the vertical vibratory movement of the shoe 50 and the resulting intermittent contact between it and the material being compacted the device may be moved about or traversed over the area to be compacted by the continuous application of a small horizontal force. The device thus in effect floats on the surface with no friction forces preventing its translation. It is therefore provided with a handle 56 by means of which an operator may easily guide it over the surface to be worked.

Referring now to Figures IX and X the embodiments of the invention may take the form of horizontally vibrated shoes 60 that are applied to the sides of a bag 61 to compact the material therein during a filling operation. The shoes 60 are resiliently supported by springs 62 from hinged arms 63 so that the shoes may be swung back out of operative position whenever a new bag is brought into filling position. The shoes 60 are coupled by springs 64 to vibration generator frames 65 and also serve to support the generator frames 65. Vibrational energy for producing vibration of the shoes 60 is provided by eccentric weights 66 carried on shafts 67 journaled in the frames 65. As in the preceding examples the strength of the coupling springs 64 and the mass of the shoes 60 are selected so that they form a vibratory system having a natural or resonant frequency equal to the speed of rotation of the eccentric weights 66.

The bag packing equipment may take the form shown in Figure X wherein the shoe 60 has a laterally extending tongue or arm 68 to which the midpoint of a beam spring 69 is attached. The beam spring 69 corresponds to the springs 64 of Figure IX. The vibration generator frame takes the form of two masses 70 one mounted on each end of the spring 69 and each provided with bearings to journal a shaft 71. The shaft 71 carries a pair of eccentric weights 72 adjacent each of the masses 70 and is coupled through a flexible coupling 73 to a motor 74 mounted on a hinged support member 75 corresponding to the arm 68. This arrangement is similar in principle of operation to the vibratory system illustrated in Figure II. In this system as in that first described the shoe 60 and the spring 69 constitute a dynamic vibration absorber for minimizing the movement of the masses 70 and shaft 71 and at the same time convert the vibrational energy into useful work in compacting the material being filled into the bags 61.

Referring now to Figures XI and XII the improved vibration generator may be utilized to drive a vibratory conveyor or other elongated vibratory work performing member. In such an apparatus the vibration generator itself may extend along the work performing member and may be coupled to it at intervals and also journal one or more shafts carrying eccentric weights. In this structure a conveyor bed or other elongated work performing member 80 is suspended or otherwise supported on a series of support springs 81 spaced at intervals along the length of the member. Vibratory energy is transmitted to the elongated work performing member 80 through a plurality of coupling springs 82 that serve as supports for a vibration generator 83 extending parallel to the work performing member 80. A plurality of eccentric weights 84 carried on transverse shafts 85 provide vibrational force that induces vibration of the work performing member 80 of such amplitude that the force transmitted through the springs 82 exactly balances the force exerted by the eccentric weights 84. As in the preceding examples this condition of tuning provides efficient energy transfer from the eccentric weights to the vibrating body without subjecting the bearings and driving means for the eccentric weights to the vibrational forces.

Referring to Figure XII a more specific structure comprises a conveyor bed 86 in the form of an elongated trough suspended by springs 87. A portion of the conveyor bed is solid while other portions are perforated so that the conveyor functions also as a screen to classify the material fed from a hopper 88 according to particle size. A vibration generator frame 89 carrying shafts 90 and eccentric weights 91 is supported by flat beam springs 92. These springs are arranged so that the principal mode of vibration of the conveyor bed 86 is inclined from the length of the bed to induce a feeding of the material thereon as indicated by the arched dotted lines representing the paths of particles being fed along the trough.

As in the preceding examples the vibration generator 89 is completely supported by the conveyor bed 86 so that all of the vibrational energy that is delivered by the driving motors and not stored in the system is dissipated in movement of the material on the conveyor itself.

In the preceding examples rotating eccentric weights disposed on one or more shafts were employed to produce intense linear or substantially linear vibration of the work performing member. Structures embodying the same principle may be employed to produce rotary vibration, i. e., vibration in which the vibrated member oscillates or rolls through small angles about an axis without substantial translation of such axis. In such an arrangement the coupling spring that couples the vibration generator frame to the member to be vibrated may be stressed in torsion or it may be one or more cantilever springs extending radially from the axis of vibration or it may consist of one or more tension or compression springs disposed parallel to the movement of particles of the vibrated member remote from the axis of vibration or center of the member.

Such a structure is illustrated schematically in Figure XIII and a comprises a work performing member 95 that is carried on a plurality of springs 96 permitting it to undergo rotary vibration. The work performing member 95 is coupled through a torsion shaft 97 acting as a coupling spring to a vibration generator 98. The generator 98 includes an rotating eccentric weight 99 that is carried on a shaft 100 extending parallel to the torsion shaft 97 and displaced a substantial distance therefrom. Preferably the shafts 97 and 100 are located at the centers of percussion of the generator 98 so that the laterally directed force of the eccentric weight on the shaft 99 exerts substantially pure torsional force on the shaft 97. The generator frame 98 however will be subjected to and respond to the components of force from the eccentric weights 99 directed along the line of centers through the shafts 97 and 100.

In this arrangement the principal mode of vibration of the system is a rotary mode that is excited by the centrifugal forces of the eccentric weight 106. The rotary movement of the work performing member 101 produces stresses in the springs 104 that opposes any movement of the generator 103 so that in this example as well as in those preceding the vibration generator itself stands substantially stationary in space while the member supporting it performs work by vibration.

In all of the examples described intense work performing vibration is produced in a first member by means of a rotating eccentric weight journaled in a second member that is resiliently supported from the first member. In each of the examples the first member and the coupling springs carrying the second member therefrom constitute a vibratory system similar to a dynamic vibration absorber for confining the vibration to the work performing member. As a result machines constructed according to these various examples are efficient in operation and do not cause vibrational disturbance in surrounding areas. The invention also includes vibration generators having spaced apart, parallelly acting springs and offset centers of gravity in which the linear vibration of the vibrated member is increased and the lateral vibration of the generator decreased from the amplitudes expected considering only the weights of the members and the rotating eccentrics.

Having described the invention, I claim:

1. In a device of the class described, in combination, a first member, said member having a surface of substantial area adapted to contact material to be worked and to support said first member on the material, a second member, resilient means supporting the second member from the first member, said resilient means forming with the first member a vibratory system having a resonant frequency, a rotatable eccentric weight journaled in the second member, and drive mechanism for rotating the weight at a speed generally equal to said resonant frequency.

2. In a device for producing linear vibration, in combination, a first member that performs work by vibration, means for resiliently supporting the first member, a plurality of struts connected to the first member, a yoke supported from the struts, a resilient beam mounted on the yoke, a second member that is mounted from the beam, a rotatable eccentric weight journaled in the second member, and means for rotating the eccentric weight at a speed generally equal to the resonant frequency of the vibratory system comprising the first member and the resilient beam.

3. In a device for producing linear vibration, in combination, an elongated member that performs work by vibration, resilient means for supporting the elongated member at spaced apart points along its length, a second member arranged generally parallel to the elongated member, a plurality of spaced apart springs for supporting the second member from the elongated member, said springs forming with the elongated member a vibratory system having a resonant frequency, at least one eccentric weight journaled in the second member and rotatable about an axis transverse to the second member and drive mechanism for rotating the weight at a speed generally equal to the resonant frequency of said vibratory system.

4. In a device for producing linear vibration, in combination, a frame, a shaft carrying an eccentric weight journaled in the frame, a member to be vibrated, resilient means for supporting the member, and a plurality of springs in spaced apart generally parallel relation that are connected to the frame and to the member, said springs being the sole support of the frame, said springs and said member forming a vibratory system having a resonant frequency equal to the speed of rotation of the shaft, and said frame having its mass disposed such that its center of gravity is located intermediate the axis of the shaft and the member to be vibrated.

5. In a device for doing work by vibration, in combination, a frame, a rotatable shaft journaled in the frame and carrying an eccentric weight, a member to be vibrated, and a spring that torsionally connects the frame and the member and that supports the frame from the member, the spring having a rate such that it and the member form a vibratory system vibrating torsionally at a resonant frequency equal to the speed of the rotatable shaft.

6. In a device of the class described, in combination, a first member that performs work by vibration, resilient means for supporting the first member, a second member, a rotatable eccentric weight journaled in the second member, means for driving the rotatable weight at a substantially constant speed, resilient means connecting said first and second members to support the second member and control the spacing between the members, said resilient means having a stiffness such that if connected between said first member and a rigid support, a vibratory system having a resonant frequency at the speed of rotation of the eccentric weight would result.

7. In a device of the class described, in combination, a first member that performs work by vibration, resilient means for supporting the first member, a second member, a rotatable eccentric weight journaled in the second member, means for driving the rotatable weight at a substantially constant speed, springs connecting the first and second members to support the second member from the first and control the spacing between the members, said springs having a stiffness such that if connected between the first member and a rigid support a vibratory system having a resonant frequency at the speed of rotation of the eccentric weight would result.

8. In a device for producing linear vibration, in combination, a first member that performs work by vibration, a second member, a rotatable eccentric weight journaled in the second member, means for driving the weight at a substantially constant speed, and a force transmission system for interconnecting the members, said system comprising a plurality of struts attached to one member and springs that are attached to the struts and to the other member, said springs having a stiffness such that if connected between said first member and a rigid support a vibratory system having a resonant condition of vibration at the frequency of rotation of the eccentric weight would result.

9. In a device for producing linear vibration, in combination, a first member that performs work by vibration, means for resiliently supporting the first member, a second member, a rotatable eccentric weight journaled generally at the center of gravity of the second member, means for driving the weight at a substantially constant speed, a plurality of generally parallel struts connected to spaced apart points of one of said members and springs connecting the other ends of said struts to the other of said members whereby the second member is supported by the first member, said springs having a stiffness such that if connected between the first member and a rigid support a vibratory system having a resonant frequency generally equal to the speed of rotation of the weight would result.

JOHN C. O'CONNOR.

References Cited in the file of this patent

UNITED STATES PATENTS

| Number | Name | Date |
|---|---|---|
| 1,787,529 | Jackson | Jan. 6, 1931 |
| 2,353,492 | O'Connor | July 11, 1944 |

FOREIGN PATENTS

| Number | Country | Date |
|---|---|---|
| 678,302 | France | Mar. 21, 1930 |